US009317699B2

(12) United States Patent
Jiang et al.

(10) Patent No.: US 9,317,699 B2
(45) Date of Patent: Apr. 19, 2016

(54) PREVENTING MALICIOUS OBSERVANCE OF PRIVATE INFORMATION

(71) Applicant: International Business Machines Corporation, Armonk, NY (US)

(72) Inventors: Li Jun Jiang, Beijing (CN); Rui Lin, Beijing (CN); Hao Meng Wang, Beijing (CN); Qin Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 14/089,051

(22) Filed: Nov. 25, 2013

(65) Prior Publication Data

US 2014/0157428 A1    Jun. 5, 2014

(30) Foreign Application Priority Data

Nov. 30, 2012    (CN) .......................... 2012 1 0505758

(51) Int. Cl.
    G06F 17/30    (2006.01)
    G06F 21/60    (2013.01)
    G06F 3/01    (2006.01)
    G06F 3/16    (2006.01)

(52) U.S. Cl.
    CPC ............... *G06F 21/60* (2013.01); *G06F 3/016* (2013.01); *G06F 3/167* (2013.01)

(58) Field of Classification Search
    CPC .......... G06F 21/60; G06F 3/167; G06F 3/016
    USPC .......................................................... 726/26
    See application file for complete search history.

(56) References Cited

U.S. PATENT DOCUMENTS

| 5,664,099 A | * | 9/1997 | Ozzie et al. | 726/29 |
|---|---|---|---|---|
| 2001/0032316 A1 | * | 10/2001 | Lu et al. | 713/182 |
| 2004/0030933 A1 | * | 2/2004 | Park | 713/202 |
| 2006/0143138 A1 | * | 6/2006 | Uehara | 705/67 |
| 2010/0115465 A1 | | 5/2010 | Lu et al. | |
| 2010/0175016 A1 | * | 7/2010 | Tian et al. | 715/773 |
| 2010/0257371 A1 | | 10/2010 | Ma | |
| 2014/0157121 A1 | | 6/2014 | Jiang et al. | |

FOREIGN PATENT DOCUMENTS

| CN | 2821828 | 9/2006 |
|---|---|---|
| CN | 201084152 | 7/2008 |

(Continued)

OTHER PUBLICATIONS

Li, Shujun et al., "Secure Human-Computer Identification (Interface Systems Against Peeping Attacks: SECHCI", Department of Electronic and Information Engineering, The Hong Kong Polytechnic University, China Aug. 2005, 30 pages.

(Continued)

*Primary Examiner* — Mohammad W Reza
(74) *Attorney, Agent, or Firm* — DeLizio Law, PLLC

(57) ABSTRACT

A technique for preventing malicious observance of private information includes receiving an instruction of entering a mode of inputting private information; determining a correspondence between actual inputs and expected inputs; receiving an actual user input; and converting the actual input into an expected input as private information inputted by the user according to the correspondence. This security technique can prevent discovery of the private information of a user through observation.

16 Claims, 4 Drawing Sheets

(56) References Cited

FOREIGN PATENT DOCUMENTS

JP    2007299353    11/2007
WO    2004057516    7/2004
WO    2010078827    7/2010

OTHER PUBLICATIONS

Mahansaria, Divyans, "Secure Password Entry Scheme in ATM Network which is Resistant to Peeping Attacks", International Journal of Engineering and Technology vol. 1, No. 2 Jun. 2009, 4 pages.

Seng, Lim Kah et al., "User's Affinity of Choice: Features of Mobile Device Graphical Password Scheme's Anti-Shoulder Surfing Mechanism", IJCSI International Journal of Computer Science Issues, vol. 8, Issue 4, No. 2 ISSN (Online): 1694-0814 www.IJCSI. org Jul. 2011, 7 pages.

"PCT Application No. PCT/CN2013/084244 International Search Report", Jan. 2, 2014, 11 pages.

"U.S. Appl. No. 14/100,770 Office Action", Feb. 27, 2015, 9 Pages.

* cited by examiner

PREVENTING MALICIOUS OBSERVANCE OF PRIVATE INFORMATION

RELATED APPLICATIONS

This application claims the priority benefit of China Application No. 201210505758.1 filed Nov. 30, 2012.

BACKGROUND

The present disclosure relates to information security techniques, and more specifically, to preventing visual exposure of security information.

Entering private information at public situations through input devices such as a keyboard may cause information leakage. A typical scenario is that, with the wide use of portable digital devices, such as smart phones, tablet computers and the like, users may handle their transactions at any time and at any places, including handling transactions in public situations. A user may need to enter private information in a dialog box displayed on a portable digital device in a public situation, and a peeper may find out the content inputted by the user through observation.

For example, if content inputted by a user is displayed on a portable digital device, a peeper may observe the display of the portable digital device to find out the content inputted by the user. Correspondingly, special characters such as "*" and the like instead of content inputted by the user can be displayed on the display of the portable digital device. This method can prevent a peeper from finding out the content inputted by the user by peeping through the display of the portable digital device. However, the peeper still can recognize the content inputted by the user by observing which keys the user clicked on an input device such as a keyboard. In particular, for a keyboard with fixed key positions, user inputs on the keyboard can be inferred through observing finger actions when the user is inputting. A keyboard with varied key positions can solve the above problem. However, if a peeper can further observe key positions on the keyboard, he/she may still find out content inputted by the user. In the case of a virtualized keyboard on a touch screen, an anti-peeping membrane can be provided on the touch screen, so that keys on the virtualized keyboard can be observed only in a certain visual angle range. However, this method is unsuitable for physical keyboards.

Other private information input manners, such as using hardware certificates, biometric features, and dynamic password generators need additional hardware overheads.

SUMMARY

An apparatus for receiving private information inputs are provided.

According to embodiment of the present disclosure, an apparatus for receiving private information inputs comprises: a receiving unit configured to receive an instruction of entering a mode of inputting private information; a determination unit configured to determine a correspondence between actual inputs and expected inputs; an acquisition unit configured to receive an actual input from a user; and a conversion unit configured to convert the actual input into an expected input according to the correspondence, wherein the expected input is treated as the private information inputted by the user.

The technical solutions provided in embodiments of this disclosure can make it more difficult for a peeper to find out content entered by the user through observing the user or the input device.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
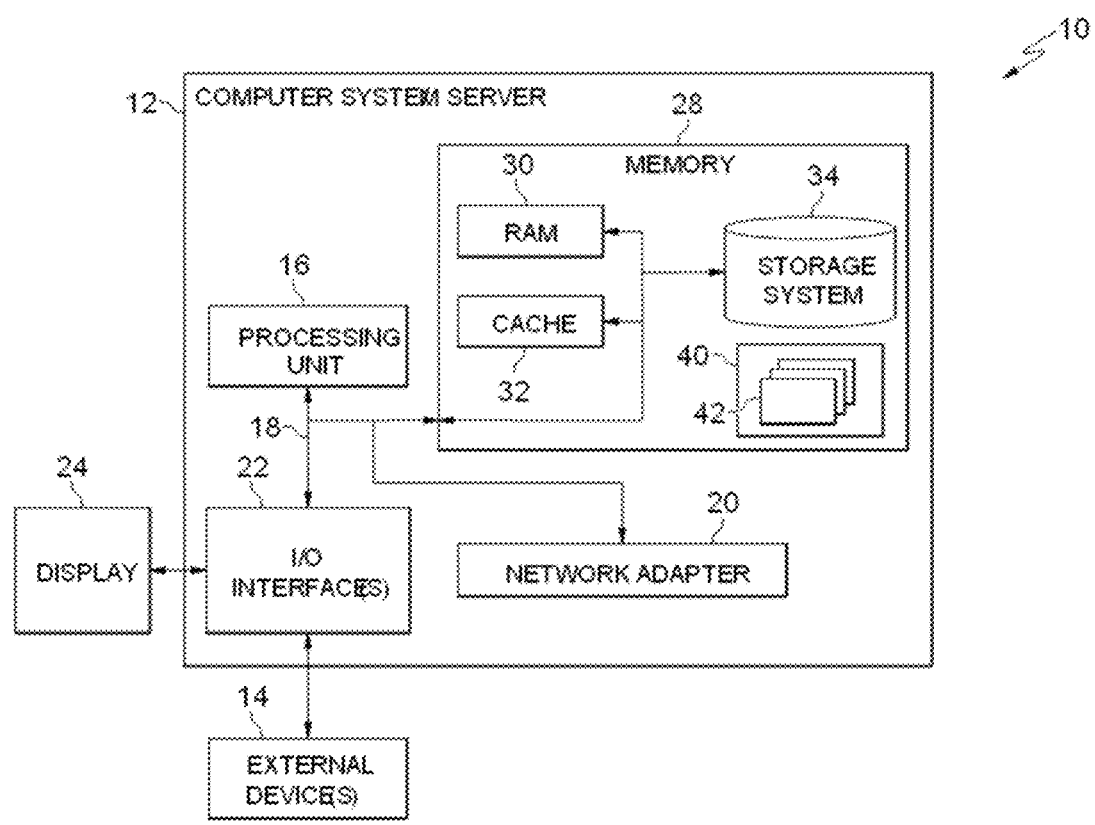
FIG. 1 shows an exemplary computer system/server 12 which is applicable to implement the embodiments of the present disclosure.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Those skilled in the art may understand that the above computer system comprises portable digital devices, such as intelligent mobile phones, tablet computers, personal digit assistants (PDA).

In the following description, embodiments of this disclosure will be described, in which a digital password is entered on a portable digital device as an example. However, private information is not limited to passwords, and may further comprise telephone numbers, email addresses, etc, and consequently, content entered by a user on a portable digital device is not limited to digits, and may comprise various characters. Further, entering a password on a portable digital device is merely a typical scenario of embodiments of this disclosure. In many other scenarios, including such as ATM machines, ticket vending machines at railway stations, hospital auto-registers or the like, users may be asked to enter passwords in public situations. In these scenarios, users can enter through virtual input devices on touch screens or through physical input devices.

Figure 2:
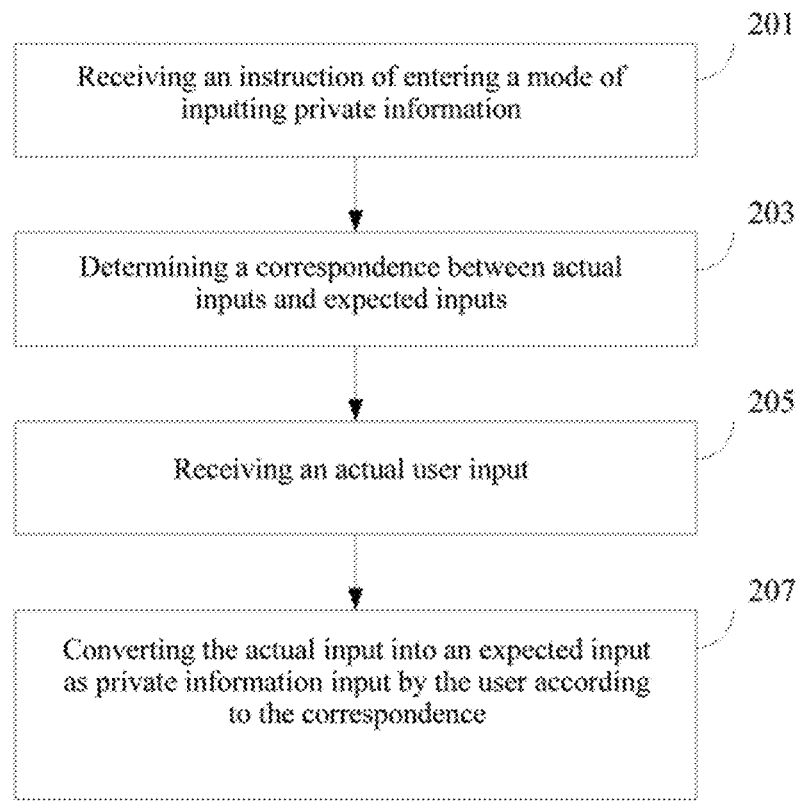
FIG. 2 is a flowchart of a method for receiving private information inputs according to an embodiment of this disclosure.

Referring to FIG. 2, FIG. 2 shows a method for receiving private information inputs according to an embodiment of this disclosure.

At step 201, an instruction of entering a mode of inputting private information is received.

An application can treat a special user operation as an instruction of entering a mode of inputting private information. According to an embodiment of this disclosure, a user may instruct to enter a mode of inputting private information by pressing a special key on a portable digital device. According to another embodiment of this disclosure, an application can send a prompt message to a user inquiring whether to enter a mode of inputting private information when some operations of the user are detected. Correspondingly, the application can use a confirmed response to the prompt message from the user as the instruction of entering a mode of inputting private information. For example, for a typical tablet computer, the virtual keyboard is hidden most of the time. An application may, in response to detecting that the virtual keyboard is enabled, send a prompt message to a user inquiring whether to enter a mode of inputting private information. If the user gives a positive response to the prompt message, the application determines that an instruction of entering a mode of inputting private information is received.

At step 203, a correspondence between actual inputs and expected inputs is determined.

If it is determined to enter a mode of inputting private information, a correspondence between actual inputs and expected inputs should be determined. Actual inputs refer to contents that directly correspond to user operations on an input device. For example, when a user presses the numeric key "1" on the keyboard, the actual input is 1. Expected inputs refer to contents of private information that are intended to enter by a user.

According to an embodiment of this disclosure, the correspondence can be set by users. Assume that a correspondence between actual inputs Actual_input and expected inputs Expected_input is as follows:

$$\text{Expected\_input} = (\text{Actual\_input} + N) \bmod 10, \text{ wherein } N \text{ is an integer} \quad (1)$$

The value of N can be specified by users. For example, a prompt message can be sent to a user to direct the user to input an integer; or ten digits from 0 to 9 can be displayed to a user, to allow the user to select one as the value of N. For example, a correspondence between actual user inputs and expected inputs is particularly shown in table 1 below.

TABLE 1

Exemplary correspondence between key inputs and expected inputs

| Actual inputs | 0 | 1 | 2 | 3 | 4 | 5 | 6 | 7 | 8 | 9 |
|---|---|---|---|---|---|---|---|---|---|---|
| Expected inputs | 2 | 3 | 4 | 5 | 6 | 7 | 8 | 9 | 0 | 1 |

The correspondence between actual inputs and expected inputs may not necessarily be a one-to-one correspondence as shown above, and can be a correspondence that is dynamically varied. For example, if a user needs to enter a four-bit password, each bit may have the same correspondence or they may have different correspondences.

At step 205, an actual user input is received.

There are various manners to enter an actual input by a user, which will be described in detail hereinafter.

At step 207, the actual input is converted into an expected input as private information inputted by the user, according to the correspondence.

With the correspondence shown in table 1, if the numeric key 0 on the keyboard is pressed by the user, an application may determine that it is actually intended by the user to input 2, and thus use 2 as the content of private information inputted by the user. Therefore, if 456789 are pressed by a user in sequence, the application may convert the actual input into expected input 678901, and take 678901 as a password inputted by the user for subsequent processes.

According to an embodiment of this disclosure, at step 203, the correspondence is set by the application. Since it is not required to set the correspondence by users, a peeper can be prevented from learning about the correspondence, and further the actual user input, through observation, by which the peeper can infer the expected user input.

After setting the correspondence, the application notifies the user of the correspondence to allow the user to infer an expected input according to the actual input, so that it is ensured that the expected input is exactly what the user wants to input. If the correspondence is displayed on the display of the portable digital device, the peeper can learn about the correspondence through observing the display. Therefore, according to another embodiment of this disclosure, the correspondence is notified to the user in an invisible manner.

According to an embodiment of this disclosure, the invisible manner is a voice manner. A portable digital device is commonly provided with a built-in speaker and an interface for connecting an attached speaker. The interface is usually used for earphone connection. Correspondingly, the application can be configured to output a voice signal indicating the correspondence only by the attached speaker. This facilitates ensuring the notification can be received by only the user. Further, the application can be configured to check whether there is an attached speaker connected to the interface. If so, the notification process proceeds; otherwise, the user is prompted to connect an attached speaker to the interface.

According to another embodiment of this disclosure, the invisible manner is vibration. For example, if the user has known that Expression (1) will be used to determine the correspondence between actual inputs and expected inputs, then only the value of N is necessary to be notified to the user.

Therefore, with respect to the correspondence of table 1, the portable digital device is directed to vibrate twice, indicating that the value of N is 2.

If a more complex algorithm is used to represent the correspondence between actual inputs and expected inputs, or in other words, if a dynamical correspondence is employed, the correspondence can be notified to the user by directly notifying the user of an expected input inferred from the actual input.

For example, a random correspondence between actual inputs and expected inputs is shown in table 2, which is not compliant with Expression (1).

TABLE 2

Exemplary correspondence between key inputs and expected inputs

| Actual inputs | 0 | 1 | 2 | 3 | 4 | 5 | 6 | 7 | 8 | 9 |
|---|---|---|---|---|---|---|---|---|---|---|
| Expected input | 3 | 8 | 2 | 4 | 7 | 6 | 2 | 9 | 0 | 1 |

Thus, if the actual input of the user received at step 205 is 1, the user is notified in voice or vibration manner that the inferred expected input is 8.

Note that the application implemented according to the method of the embodiment of this disclosure can be deployed on a portable digital device, or can be deployed on other device which communicates with a portable digital device. For example, the user can register on a remote bank server with a portable digital device to handle some online banking transaction, then steps 201 to 207 can be performed by the bank server. The bank server can interact with the user through a client program on the portable digital device.

Below, some implementations according to embodiments of this disclosure will be described in connection with accompanying drawings.

Figure 3A:
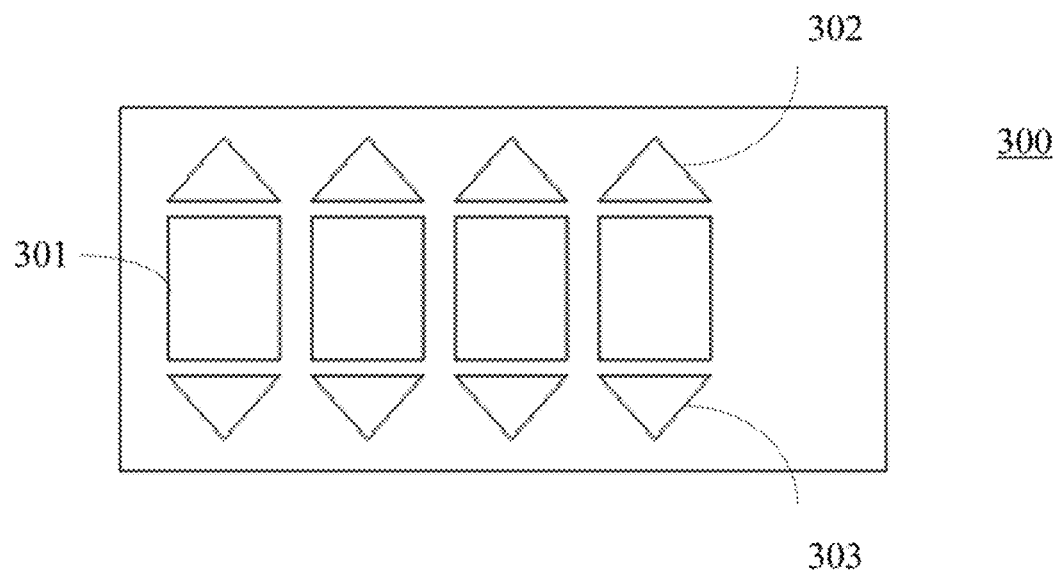
FIG. 3A to FIG. 3C are an implementation according to an embodiment of this disclosure.
Figure 3B:
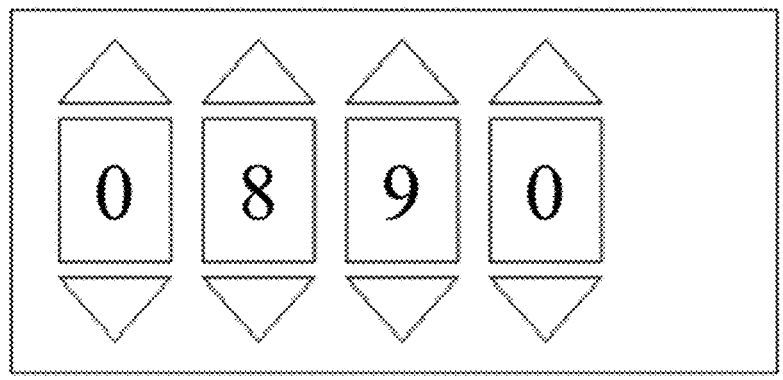
Figure 3C:
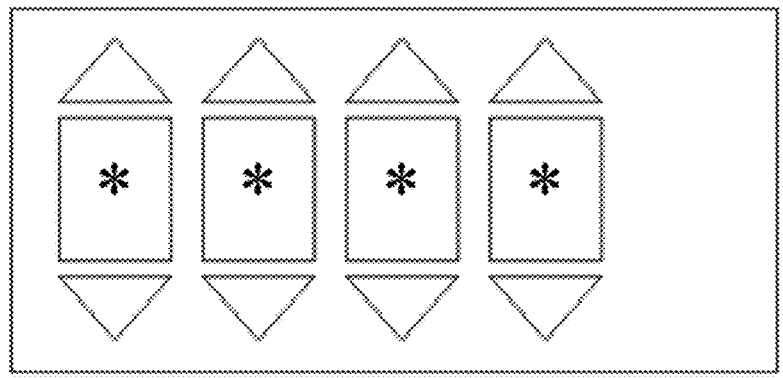

FIGS. 3A to 3C show an implementation according to an embodiment of this disclosure.

FIG. 3A shows an interface displayed to a user after an instrument of entering a mode of inputting private information is received at step 201. The interface 300 shown in FIG. 3 comprises four password input fields 301, each including a corresponding up-scrolling key 302 and a down-scrolling key 303. A user can control the password input in the password input fields 301 by pressing the up-scrolling keys 302 or the down-scrolling keys 303.

According to an embodiment of this disclosure, the correspondence represented by Expression (1) is employed. If N has the same value for the four-bit password, when the interface 302 is displayed, the value of N can be notified to the user through voice or vibration. If N has different values for the four-bit password, when an up-scrolling key or a down-scrolling key corresponding to a password input field is pressed by the user for the first time, the value of N corresponding to the password input field is notified to the user through voice or vibration. Correspondingly, a present actual input is displayed in each password input field, so that the user can infer expected inputs according to displayed actual inputs and the values of N. If N takes 2 for all of the four bits of the password, the actual input shown in FIG. 3B corresponds to "2012" as the expected input of the user.

According to another embodiment of this disclosure, with the correspondence shown in table 2, once the user presses an up-scrolling key or a down-scrolling key, a present expected input is notified to the user through voice or vibration. In this case, it is not necessary to display the present actual input in the password input fields, and an interface shown in FIG. 3C can be displayed.

Figure 4A:
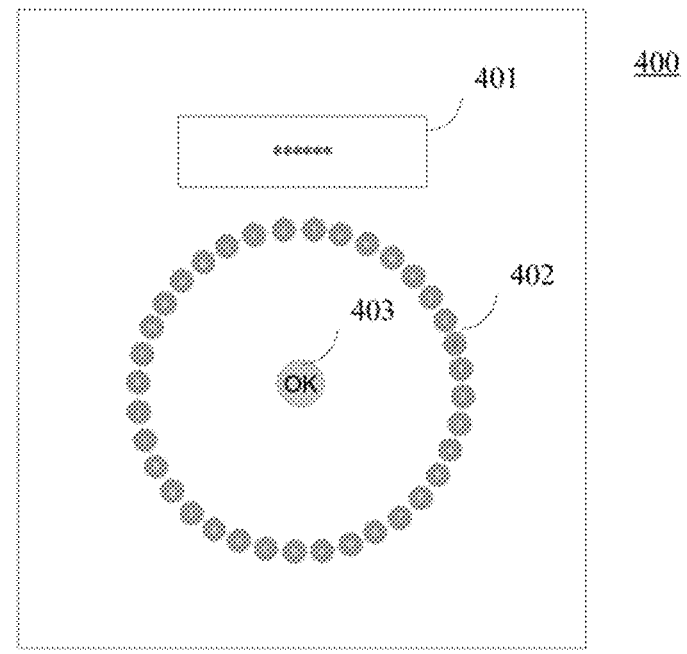
FIG. 4A to FIG. 4B are an implementation according to another embodiment of this disclosure.
Figure 4B:
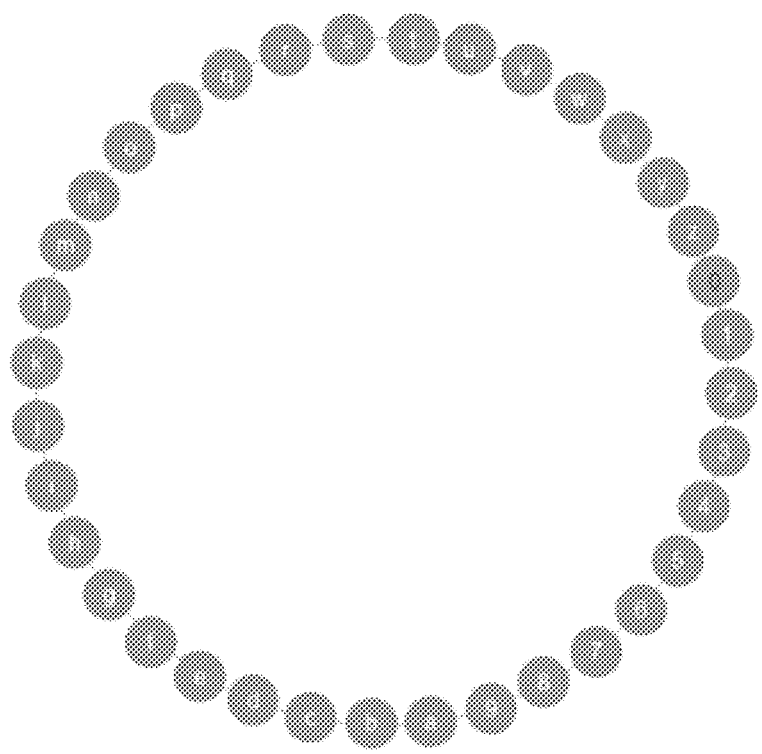

FIG. 4A to FIG. 4B show an implementation according to another embodiment of this disclosure.

FIG. 4A shows an interface that is displayed to the user after an instruction of entering a mode of inputting private information is received at step 201. The interface 400 shown in FIG. 4 comprises a password input field 401, a character dial 402 and an OK key (confirmation key) 403. The character dial 402 comprises keys representing 10 digits from 0 to 9 and 26 low case letters a-z. According to an embodiment of this disclosure, the keys representing the digits and the low case letters are arranged on the dial in sequence as shown in FIG. 4B. According to another embodiment of this disclosure, the keys are randomly arranged on the dial.

In the case of sequentially arranged keys, a correspondence similar to that of Expression (1) can be employed. Therefore, when the user presses a key on the character dial, the actual user input is the character shown on that key, while the expected input is the character shown on the Nth key in the clockwise or the anticlockwise direction from the pressed key, wherein N is an integer. In this case, it is sufficient to notify the user of the selection for the clockwise or anticlockwise direction and the value of N in an invisible manner. The user can press keys on the character dial to enter an actual input. Optionally, an expected input inferred from the actual input can be notified to the user in an invisible manner. The user can check and then press the OK key to indicate the completion of input of a character of the private information. Optionally, key positions on the character dial can vary at that point, or the selection for the clockwise or anticlockwise direction or the value of N can be changed, after which the user can be notified to enter the next actual input.

Those skilled in the art may conceive other particular implementations according to the above description. For example, after entering a mode of inputting private information, a virtual numeric keyboard can be displayed to a user, with variable or fixed values displayed on various keys on the virtual numeric keyboard. If the user presses a numeric key with a digit displayed thereon, the digit is the actual input of the user, and the correspondence can be notified to the user in an invisible manner as described previously.

Also, after entering a mode of inputting private information, the user can be notified through voice to enter an actual input by, for example, shaking or rotating the portable digital device. For example, the user can be notified through voice to rotate the portable digital device from a present location in the anticlockwise direction with rotation angles, in the order from small to large, representing expected inputs 4, 5, 6, 7, 8, and rotate in the clockwise direction with rotation angles, in the order from small to large, representing expected inputs 3, 2, 1, 0, 9. Further, when the portable digital device is actually rotated to an angle by the user, an expected input corresponding to the present angle can be notified to the user in an invisible manner such as through voice or vibration.

Figure 5:
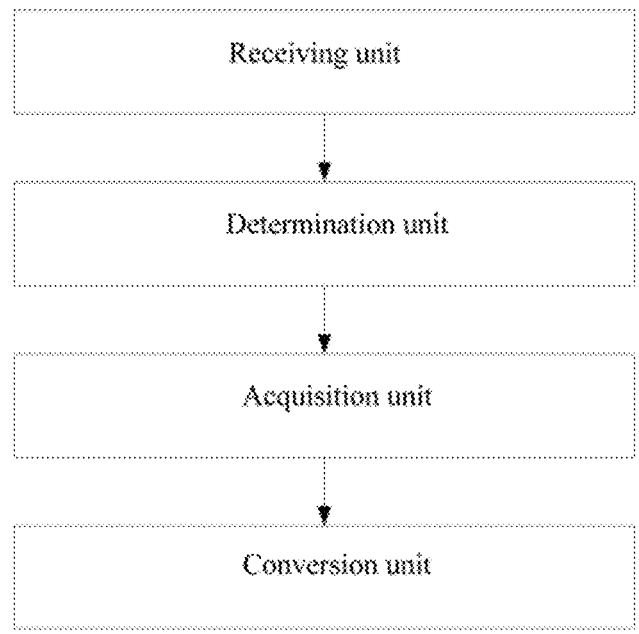
FIG. 5 is a block diagram of an apparatus for receiving private information inputs according to an embodiment of this disclosure.

FIG. 5 shows an apparatus for receiving private information inputs according to an embodiment of this disclosure. The apparatus comprises a receiving unit configured to receive an instruction of entering a mode of inputting private information; a determination unit configured to determine a correspondence between actual inputs and expected inputs; an acquisition unit configured to receive an actual input from a user; and a conversion unit configured to convert the actual input into an expected input as private information inputted by the user according to the correspondence.

The determination device further comprises a setting receiving module configured to receive a setting of the correspondence from a user.

The determination device further comprises an auto-setting module configured to automatically set the correspondence; and a notification module configured to notify the user of the correspondence.

The notification module comprises a module configured to notify the user of the correspondence only in an invisible manner.

The module configured to notify the user of the correspondence only in an invisible manner comprises a module configured to notify the user of the correspondence through voice.

The module configured to notify the user of the correspondence through voice comprises a module configured to notify the user of the correspondence only through an attached speaker of a terminal device used by the user.

The module configured to notify the user of the correspondence only in an invisible manner comprises a module configured to notify the user of the correspondence by instructing a client device used by the user to vibrate.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for preventing data exposure, the computer program product comprising:
a non-transitory, computer readable storage medium having computer usable program code embodied therewith, the computer usable program code comprising a computer usable program code to,
present, via a graphical user interface, a plurality of input fields and visible input cues for user input, wherein one or more pairs of the visible input cues flank each of the plurality of input fields, wherein at least one of the visible input cues indicates one or more different directions for selecting the user input relative to a flanked input field, and wherein one of the visible input cues is associated with an expected input value that differs from the one of the visible input cues;
determine a correspondence between the one of the visible input cues and the expected input value before the one of the visible input cues is selected,
wherein the correspondence indicates how the one of the visible input cues differs from the expected input value;
generate an invisible output that indicates the correspondence between the one of the visible input cues and the expected input value;
detect a selection of the one of the visible input cues via the graphical user interface; and
use, as the user input, the expected input value instead of the one of the visible input cues in response to the selection of the one of the visible input cues.

2. The computer program product of claim 1, wherein the computer usable program code to present, via the graphical user interface, the visible input cues comprises computer usable program code to present the visible input cues in a circle.

3. The computer program product of claim 1, wherein the computer usable program code comprises computer usable program code to initially populate the plurality of input fields with random values that are not private information.

4. The computer program product of claim 1, wherein the computer usable program code further comprises computer usable program code to pass input values corresponding to a series of selected visible input cues to an application after a submit visual input cue is selected, wherein the expected input value is included in the input values.

5. The computer program product of claim 1, wherein the computer usable program code further comprises computer usable program code to convert a first value, which the selected one of the visible input cues indicates, to a second value that is the expected input value.

6. The computer program product of claim 5, wherein the computer usable program code to convert the first value to the second value comprises computer usable program code to apply a conversion formula to the first value, wherein the conversion formula was pre-selected.

7. The computer program product of claim 5, wherein the computer usable program code further comprises computer usable program code to automatically select a conversion formula and generate, as the invisible output, a notification of the automatically selected conversion formula before detecting the selection of the one of the visible input cues, wherein the computer usable program code to convert the first value to the second value comprises the computer usable program code to apply the automatically selected conversion formula to the first value.

8. The computer program product of claim 1, wherein the computer usable program code further comprises computer usable program code to verify that an earphone is connected to an audio interface of a device that presents the graphical user interface, wherein the computer usable program code to generate the invisible output comprises computer useable program code to present an audio output via the audio interface connected to the earphone instead of via other audio output devices.

9. An apparatus comprising:
a processor;
an audio output interface;
a display; and
a non-transitory, computer readable storage medium having computer usable program code embodied therewith, the computer usable program code executable by the processor to cause the apparatus to, present on the display a graphical user interface that presents a plurality of input fields and visible input cues for user input, wherein each of the visible input cues corresponds with each one of expected input values, wherein one or more pairs of the visible input cues flank each of the plurality of input fields, and wherein one or more of the visible input cues indicate one or more different directions for selecting the user input relative to a flanked input field;

determine a correspondence between at least one of the visible input cues at least one of the expected input values, wherein the at least one of the visible input cues indicate a value other than the at least one of the expected input values;

generate one or more of an audio output or a tactile output that indicates the correspondence between the at least one of the visible input cues and the at least one of the expected input values;

detect a selection of the at least one of the visible input cues via the graphical user interface; and use, as the user input, the at least one of the expected input values instead of the at least one of the visible input cues in response to the selection of the at least one of the visible input cues.

10. The apparatus of claim 9, wherein the computer usable program code executable by the processor to cause the apparatus to present the graphical user interface that presents the visible input cues comprises computer usable program code to present the visible input cues in a circle.

11. The apparatus of claim 9, wherein the computer usable program code comprises computer usable program code executable by the processor to cause the apparatus to initially populate the plurality of input fields with random values that are not private information.

12. The apparatus of claim 9, wherein the computer usable program code further comprises computer usable program code executable by the processor to cause the apparatus to pass input values corresponding to a series of selected visible input cues to an application after a submit visual input cue is selected.

13. The apparatus of claim 9, wherein the computer usable program code further comprises computer usable program code executable by the processor to cause the apparatus to verify that an earphone is connected to the audio output interface, wherein the audio output is output via the audio output interface connected to the earphone instead of via other audio output components of the apparatus.

14. The computer program product of claim 1, wherein the invisible output comprises one or more of an audio output or a voice output.

15. The computer program product of claim 1, wherein the invisible output comprises one or more of a tactile output or a vibration output.

16. A method comprising:

presenting, via a graphical user interface, a plurality of input fields and visible input cues for user input, wherein one or more pairs of the visible input cues flank each of the plurality of input fields, wherein one or more of the visible input cues indicate one or more different directions for selecting the user input relative to a flanked input field, and wherein one of the visible input cues is associated with an expected input value that differs from the one of the visible input cues;

automatically determining, via a processor, a correspondence between the one of the visible input cues and the expected input value before the one of the visible input cues is selected, wherein the correspondence indicates how the one of the visible input cues differs from the expected input value;

electronically generating an invisible output that indicates the correspondence between the one of the visible input cues and the expected input value;

automatically detecting a selection of the one of the visible input cues via the graphical user interface; and using, as the user input, the expected input value instead of the one of the visible input cues in response to the selection of the one of the visible input cues.

\* \* \* \* \*